Feb. 14, 1950  C. F. VOYTECH  2,497,704
SELF-CONTAINED SEAL
Filed Jan. 17, 1945
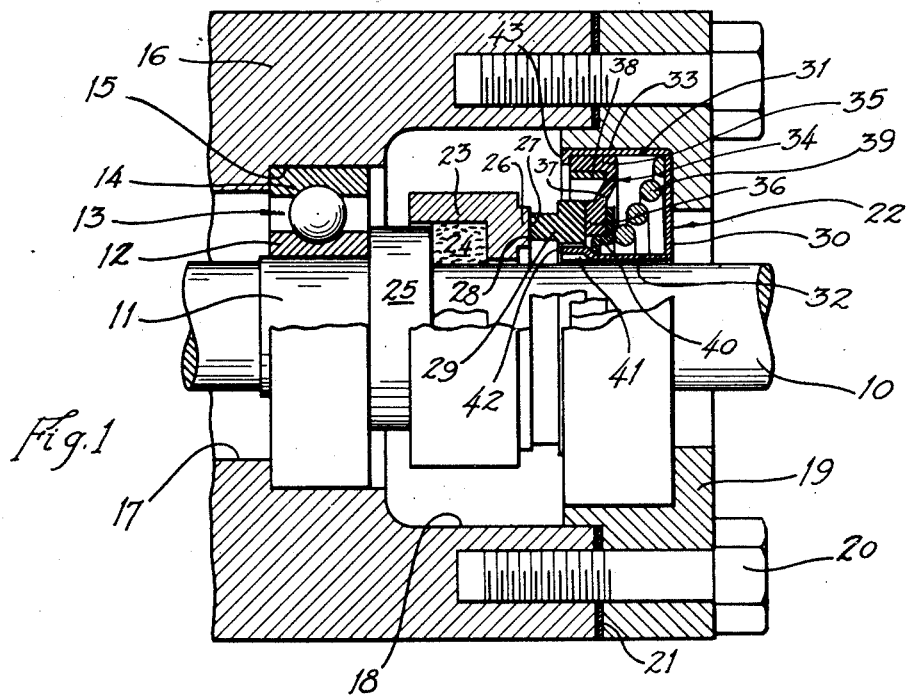
Fig.1
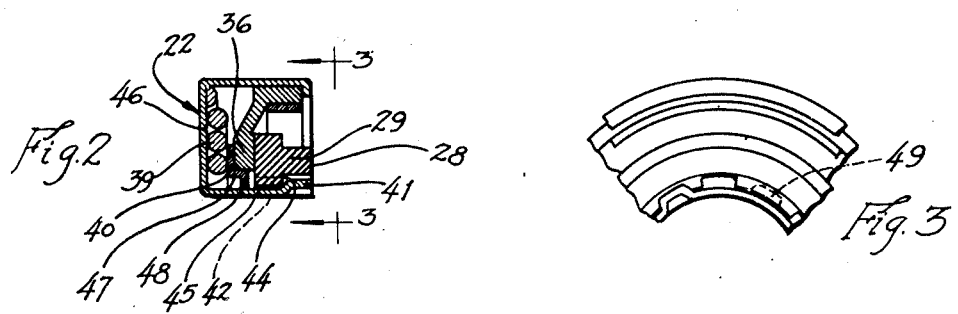
Fig.2
Fig.3
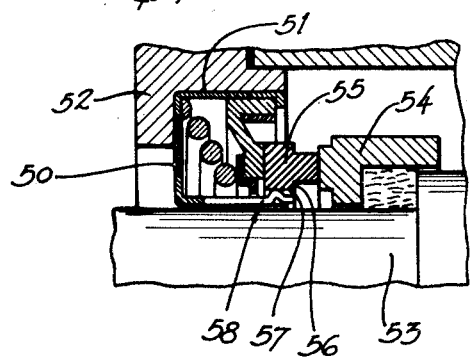
Fig.4
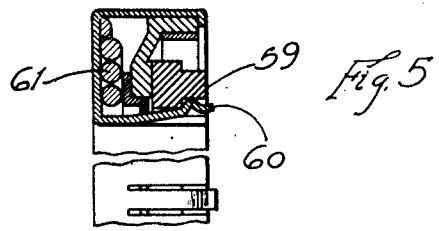
Fig.5
INVENTOR.
BY Charles F. Voytech Patented Feb. 14, 1950

2,497,704

UNITED STATES PATENT OFFICE 2,497,704

SELF-CONTAINED SEAL

Charles F. Voytech, Chicago, Ill., assignor to Crane Packing Company, Chicago, Ill., a corporation of Illinois Application January 17, 1945, Serial No. 573,255

4 Claims. (Cl. 286—11)

This invention relates to rotary seals and particularly to that type of seal utilizing a pair of sealing surfaces disposed at right angles to the axis of the rotating member.

In a co-pending application of Russell D. Snyder, S. N. 562,632, filed November 9, 1944, now Patent No. 2,432,694, there is described a rotary seal, the portion thereof having the axially movable sealing surface being self-contained so that all the elements of that portion may be handled and installed as a unit. This is brought about by the use of an annular container having a side opening, the elements of the seal comprising a rubber bellows acting as a flexible fluid seal, a clamping ring for clamping one end of the bellows to the container, driving means for the sealing washer driven from the clamping ring, and spring all being positioned within the container. The washer is placed adjacent the other end of the bellows and in cooperative relation with the driving means, but is not completely retained within the container. The container is then pressed either into a suitable opening in the stationary element or upon a shaft as the case may be. To take full advantage of the self-contained features of the Snyder seal, however, it is desirable to limit the size of the container to the point where it does not take up any more space than an oil seal of equivalent diameter.

The principal object of this invention is to provide an improved self-contained rotary seal of the type described which is very compact, simple to install and inexpensive to make.

A more specific object of this invention is to provide a self-contained seal in which the axial dimension is shortened by telescoping certain of the elements thereof over one another.

A still more specific object of this invention is to provide a self-contained seal which utilizes an annular container opened at one side, a sealing washer positioned at the open side, a flexible sealing element closing off the space between the washer and the outer cylindrical wall of the container, and a driving connection between the washer and the inner cylindrical wall of the container.

It is also desirable when shipping a complete unit to ship the sealing washer with the unit. These washers, however, have lapped sealing surfaces which must be protected in transit. A further object therefore is to provide a self-contained seal which is capable of maintaining the washer and its lapped sealing surface within the protection of a less easily damaged part of the seal. Specifically, it is an object of this invention to provide readily operable means for holding the washer in a retracted position in the container so that the container serves as a shield for the washer.

These and other objects and features of this invention will become apparent from the following detailed description of the invention when taken together with the accompanying drawings in which Fig. 1 is a section through a sealing apparatus made in accordance with this invention showing how it can be used to provide a seal between a rotating shaft and a stationary frame or housing;

Fig. 2 is an obverse section through the sealing apparatus of Fig. 1 showing the sealing washer in retracted position;

Fig. 3 is a fragmentary elevation taken along lines 3—3 of Fig. 2 showing the means by which the sealing washer is held in retracted position;

Fig. 4 is a fragmentary section through another embodiment of this invention; and Fig. 5 is a fragmentary section corresponding to the section shown in Fig. 4 but showing the sealing washer in retracted position.

Referring now to Fig. 1 for a detailed description of the invention, there is shown a shaft 10 having a portion of increased diameter 11 on which is mounted the inner race 12 of a ball-bearing 13, the outer race 14 of the bearing being press-fitted into a recess 15 in a frame or housing 16. Said housing 16 has an opening 17 of larger diameter than shaft 10 in which may be retained a fluid under pressure. Said opening is in communication with an adjoining chamber 18 through the space between the inner and outer races 12 and 14, said chamber being partially closed by a plate 19 which is secured to frame 16 by bolts 20 or the like. A gasket 21 provides a fluid-tight joint between the frame 16 and 19. The remainder of the closure is effected by means of a sealing apparatus designated generally by the reference character 22 which cooperates with a sealing ring 23 mounted for rotation with shaft 10 by means of a resilient compressible ring 24 of rubber or the like which is compressed upon shaft 10 and abuts a shoulder 25 formed integrally with shaft 10 or formed separately and press-fitted or otherwise secured to said shaft. Sealing ring 23 does not touch either shaft 10 or shoulder 25 and hence is free to adjust itself to vibrations in both axial and radial directions.

Sealing ring 23 is formed with a nose 26 having a radial surface 27 which is ground and lapped so as to be perfectly smooth and flat. Said surface 27 cooperates with a similarly lapped surface 28 formed on a sealing washer 29 which may be either metallic or of some suitable anti-friction composition. Said washer 29 is partially enclosed by an annularly shaped container or support 30 which is provided with a cylindrical outer wall 31 and a cylindrical inner wall 32. Outer wall 31 is pressed into a recess 33 in end plate 19 so as to form a fluid-tight seal between support 30 and the end plate 19.

A seal is effected between washer 29 and support 30 by means of a flexible resilient sealing member 34 made of rubber or the like and comprised of a substantially cylindrical outer flange 35 and an inner flange 36 connected by a diaphragm 37. Flange 34 is compressed against outer cylindrical wall 33 by a rigid band 38, and flange 36 is pressed against the back of sealing washer 29 by a spring 39. Said spring is of conical form such that one end is retained in the upper right-hand corner (Fig. 1) of support 22 and the other and smaller end presses against a washer 40 which in turn bears against flange 36 to transmit the spring pressure to said flange.

Washer 29 is prevented from rotating relative to support 40 by means of one or more lugs 41 formed in the inner wall 32 of the support and which cooperate with grooves 42 formed in washer 29. The connection between each washer and lug is such as to permit relative axial movement therebetween under the influence of spring 39 so that the washer can adjust itself to vibrations of the shaft and its associated sealing element 23, as well as take up for wear of the sealing surfaces.

The method of assembling the various components of sealing apparatus 22 will be described hereinafter. It should be mentioned here, however, that after the elements are assembled, a flange 43 is turned inwardly from outer wall 31 to form a retaining wall for flange 35 of flexible sealing element 34 to prevent the latter from working outward under operating conditions.

Referring now to Figs. 2 and 3, it will be noted that washer 29 is formed with a vertical surface 44 on the inside thereof and that the inner surface 45 of washer 29 is of smaller diameter than the diameter of lugs 41. Thus, when washer 29 is pressed inwardly with lugs 41 engaging grooves 42 until the lugs are free of the grooves, and then turned slightly so as to misalign the lugs and grooves, the washer will then be prevented from leaving support 22.

It is contemplated that the length of a lug 41 will be so chosen with reference to sealing surface 28 that the surface will be substantially protected by the support and will not protrude from the support where it may be exposed and subjected to rough treatment and hence rendered useless as a sealing surface.

The axial dimension of the support 22 is so selected that when washer 29 is held as shown in Fig. 2, spring 39 will be held substantially flat against the radial wall 46 of the support. This insures the shallowest support and hence one that is more readily and cheaply made.

Washer 40 has a cylindrical portion 47, the outer diameter of which is substantially the same as the inside diameter of inner flange 36 of sealing member 34 and is centered thereby. Said washer 40 has also a radially inwardly depending flange 48 which is likewise provided with a groove 49 (Fig. 3) so that the washer may act as a stop for spring 39 after the spring and washer are assembled in the support. It is contemplated that washer 40 will be inserted into the support by aligning the groove 49 with a lug 41, passing the washer over the lug and then turning it so that it will be out of alignment with the lug and hence stay in place in the support.

In assembling the elements of the apparatus, spring 39 is first inserted into the support 22, followed by washer 40, the washer being passed over the lugs 41 and then turned as mentioned above. Next, the sealing element 34 is assembled with a band 38 and the two are then pressed into the support until they reach substantially the position shown in Figs. 1 and 2. It will be noted that band 38 will abut diaphragm 37 during the movement inward and that the diaphragm prevents the flange from rolling under the band as the two are moved into place. When the band and sealing element are properly located, the outer wall 31 is rolled or crimped radially inwardly to hold flange 35 against movement out of support 22 under the action of fluid pressure or the pressure of spring 39.

The last element to be assembled is the washer 29 and it is simply passed over lugs 41, the flange 36, washer 40 and spring 39 being moved inwardly in unison with washer 29 until groove 42 is free of lug 41, whereupon washer 29 is turned slightly and permitted to spring back. The apparatus is then ready for shipment and may be wrapped and sent to its destination as a complete unit ready to be pressed into a housing or upon a shaft, as the case may be. Upon reaching its destination, the washer can be made ready for operation by slightly depressing it in the support and then turning it back until grooves 42 are in line with lugs 41, and then releasing it. It will be noted that washer 29 may be replaced whenever necessary without disturbing the remainder of the sealing apparatus. When in use, however, the pressure of spring 39 on flange 36 is sufficient to form a fluid-tight seal between the washer and sealing element and the two are moved by the spring as a single unit.

The sealing apparatus just described provides protection for the washer by means of a device which resembles a bayonet connection such as is used in vacuum tubes and the like. It involves an axial pressure on the washer with a turning movement after the washer is pressed to the required depth. In the modification shown in Figs. 4 and 5 the washer is latched in a retracted position merely by exerting an axial pressure on the washer to a point where the latch becomes effective.

Referring now to Figs. 4 and 5, there is shown a sealing apparatus 50 which is pressed into a recess 51 in a closure member 52 and a shaft 53 on which is a sealing element 54 adapted to cooperate with a sealing washer 55 forming part of sealing apparatus 50. Said washer 55 is likewise provided with a radially disposed surface 56 on the inside thereof and with a plurality of grooves 57 in each of which is disposed a latch 58. The grooves are preferably arranged symmetrically around the inside of the washer. Said latch 58 is formed integrally with the support 50, the support being made of material which is sufficiently resilient to cause latch 58 to spring radially upwardly against the groove 57 in washer 55.

Said latch 58 is formed with a ridge 59 terminating in a relatively flat extension 60, said ridge being of substantially the same height as the radial dimension of surface 56 on washer 55. Thus, when washer 55 is inserted into support 50, the grooves 57 thereof are first aligned with latches 58 and the washer is then pressed radially inwardly until the ridges 59 on the latches pass completely through the grooves and engage the radial surface 56. It is contemplated that the angle of ridge 59 relative to surface 56 will be such that the spring 61 will not be able to force washer 55 back over ridge 59.

As in Fig. 1 form, the apparatus shown in Figs. 4 and 5 can be shipped with washer 55 in a latched position as shown in Fig. 5, wherein substantially the entire washer is retained within the confines of support 50 and hence is protected thereby. When installed, washer 55 is released by moving latches 58 radially inwardly by means of rubber-covered pliers or other contracting instrument until radial surface 56 is free, whereupon spring 61 will effectuate the complete axial movement of the washer to its desired position.

The Fig. 1 and Fig. 4 forms are both very compact in an axial direction and approach in size the dimension of any of the oil seals now commonly used, so that no additional space need be allowed for in the design of the machine to which the sealing apparatus of this invention is to be applied. All of the advantages inherent in a seal against a radial face are retained as well as the self-contained feature of the aforesaid commonly used oil seals. Since the axial dimension is relatively small, the support can be formed with a single drawing operation. It will be noted that the sealing element 34 by which the washer is sealed relative to the support 22 is of simple construction and can be formed in a two-part mold without any difficulty. Thus the sealing element is relatively inexpensive and yet provides a maximum of freedom of movement to the sealing washer. It is contemplated that the relaxed form of the sealing element will be substantially that shown in Figs. 2 and 5 and that the diaphragm 37 will be compressed and then released as the washer moves from the Fig. 2 position to the Fig. 1 position. Alternatively the relaxed form of the sealing element may be that shown in Fig. 1. In either case, the freedom of movement of flange 36 under the action of spring 39 will be substantially the same.

The sealing apparatus is shown pressed into a stationary closure or end plate cooperating with a rotating sealing element. Obviously the condition could be reversed so that the apparatus is pressed upon a rotating shaft and is made to cooperate with a fixed sealing element. This is brought about by the fact that support 22 has two cylindrical walls, either one of which may be finished to the desired close tolerance to form a pressed fit either upon a shaft or a stationary member. It is also obvious that both washer 29 and washer 55 could be made to cooperate with a sealing surface formed in a shoulder on the shaft instead of upon a ring which is flexibly retained on the shaft as shown, or said washer could be made to cooperate directly with the radial face of inner race 12 of ball-bearing 13.

It is understood that the foregoing description is illustrative of preferred embodiments of this invention and that the scope of the invention is not to be limited thereto, but is to be determined by the appended claims.

What is claimed is:

1. A sealing apparatus for effecting a seal between two relatively rotatable elements, said apparatus comprising an annular container having a side opening, a sealing washer having a sealing surface thereon, said washer being positioned within the container so that the sealing surface is outside the container, means for effecting a seal between the washer and container, and means on the container for releasably holding the washer in a retracted position, such that the sealing surface is protected by the container, said holding means, when said washer is released, serving to prevent relative rotation between the washer and container but permitting relative axial movement therebetween.

2. A sealing apparatus for effecting a seal between two relatively rotatable elements, said apparatus comprising an annular container having a side opening, a sealing washer having a sealing surface thereon, said washer being normally positioned within the container in a manner such that the sealing surface protrudes beyond the confines of the container, means for effecting a seal between the washer and container, a lug on the container projecting radially in the direction of the washer, said washer having an axial groove adapted to accommodate the lug, and resilient means for urging the washer out of the container, said resilient means being compressible such that when the washer is pressed inwardly and then turned so that the groove and lug are misaligned, the washer is held against the lug in a substantially completely retracted position.

3. A sealing apparatus for effecting a seal between two relatively rotatable elements, said apparatus comprising an annular support, a sealing washer having a sealing surface thereon, said washer being normally positioned within the support in a manner such that the sealing surface protrudes beyond the confines of the support, means for effecting a seal between the washer and support, a latch on the support, said washer having a substantially radial surface with which the latch is adapted to cooperate to hold the washer against axial movement out of the support, and resilient means for urging the washer out of the support, said washer when pressed into the confines of the support against the action of the resilient means being held by the latch so that the sealing surface on the washer is protected by the support.

4. A sealing apparatus for effecting a seal between two relatively rotatable elements, said apparatus comprising an annular support, a sealing washer having a sealing surface thereon, said washer being normally positioned within the support in a manner such that the sealing surface protrudes beyond the confines of the support, means for effecting a seal between the washer and support, a spring latch formed integrally with the support, said washer having an axial groove and a substantially radial surface with which the latch is adapted to cooperate to hold the washer against axial movement out of the support and resilient means for urging the washer out of the support, said latch cooperating with the groove to provide a positive sliding driving connection between the washer and container when the washer is released.

CHARLES F. VOYTECH.

REFERENCES CITED

The following references are of record in the file of this patent:

UNITED STATES PATENTS

| Number | Name | Date |
|---|---|---|
| 2,076,716 | Fretter | Apr. 13, 1937 |
| 2,311,494 | Vedovell | Feb. 16, 1943 |
| 2,322,835 | Dornhofer | June 9, 1943 |
| 2,347,118 | Matter | Apr. 18, 1944 |
| 2,377,452 | Reynolds | June 5, 1945 |
| 2,382,960 | Compton | Aug. 21, 1945 |
| 2,385,420 | Meyer | Sept. 25, 1945 |